US008615031B2

United States Patent
Kim et al.

(10) Patent No.: US 8,615,031 B2
(45) Date of Patent: Dec. 24, 2013

(54) SIGNAL PROCESSING METHOD, CORRELATOR, SOFTWARE SIGNAL RECEIVER BY USING CODE CYCLE

(75) Inventors: Tae Hee Kim, Daejeon (KR); Sang Uk Lee, Daejeon (KR)

(73) Assignee: Electronics and Telecomunications Research Institute, Daejeon (KR)

( * ) Notice: Subject to any disclaimer, the term of this patent is extended or adjusted under 35 U.S.C. 154(b) by 0 days.

(21) Appl. No.: 13/445,813

(22) Filed: Apr. 12, 2012

(65) Prior Publication Data

US 2013/0010837 A1  Jan. 10, 2013

(30) Foreign Application Priority Data

Jul. 8, 2011  (KR) .................. 10-2011-0068056

(51) Int. Cl.
*H04B 1/00* (2006.01)
(52) U.S. Cl.
USPC .......................................................... 375/150
(58) Field of Classification Search
None
See application file for complete search history.

(56) References Cited

U.S. PATENT DOCUMENTS 6,441,781 B1 *  8/2002  Rog et al. ................. 342/357.73
2006/0029175 A1 *  2/2006  Schnarr ......................... 375/376

FOREIGN PATENT DOCUMENTS

| JP | 2002-531988 A | 9/2002 |
| KR | 10-2005-0059218 A | 6/2005 |
| KR | 10-2009-0036863 A | 4/2009 |

\* cited by examiner

*Primary Examiner* — Leon-Viet Nguyen

(57) ABSTRACT

Disclosed are a signal processing method using a code cycle, a correlator, and a software signal receiver. An exemplary embodiment of the present invention provides a signal processing method of a satellite navigation signal, including: a frequency generating step generating a predetermined frequency component for removing a frequency component of sample data; a code generating step generating a predetermined code component for removing a code component of the sample data and increasing a sample count when the predetermined code component is generated; and a correlation value generating step, if the sample count is equal to a count per unit time, generating a correlation value between the generated predetermined frequency component and the generated predetermined code component by reading a sample data block.

8 Claims, 3 Drawing Sheets

| DCO HIGHEST THREE BITS | 000 | 001 | 010 | 011 | 100 | 101 | 110 | 111 |
|---|---|---|---|---|---|---|---|---|
| sin | +1 | +2 | +2 | +1 | −1 | −2 | −2 | −1 |
| cos | +2 | +1 | −1 | −2 | −2 | −1 | +1 | +2 |

SIGNAL PROCESSING METHOD, CORRELATOR, SOFTWARE SIGNAL RECEIVER BY USING CODE CYCLE

CROSS-REFERENCE TO RELATED APPLICATIONS

This application claims priority to and the benefit of Korean Patent Application No. 10-2011-0068056 filed in the Korean Intellectual Property Office on Jul. 8, 2011, the entire contents of which are incorporated herein by reference.

TECHNICAL FIELD

The present invention relates to a signal processing method, a correlator, and a software signal receiver that processes a signal using a software based receiver rather than a hardware based receiver in processing a satellite navigation signal such as a GPS signal.

BACKGROUND ART

A GPS (global positioning system) is a global measurement system that measures a distance between a satellite and a receiver from a propagation delay time of an electric wave to determine a position of the receiver. Recently, various satellite navigation systems such as a Galileo from Europe, QZSS from Japan, and COMPAS from China have been established other than the GPS.

Researches on a receiver design, which is a core technology on a user side, were mainly focused on a hardware GPS receiver design based on an ASIC chipset model before 2000. The hardware based receiver can advantageously realize a highly integrated multichannel correlator based on a receiver design that is specialized in an application field and an advanced ASIC design technology. In contrast, the hardware based receiver has a limitation to apply to diversified satellite navigation system because the GPS chipset needs to be re-designed in order to change the design of the receiver and improve the performance.

In order to overcome the above-mentioned disadvantages, a design of a software based GPS receiver which is a new design method has become a research topic since the late 1990s and the researches thereof have actively been conducted. Research of the software receiver design technology starts with a multipurpose communication system design technology to which an initial SDR (software defined radio) concept is applied. Generally, the software GPS receiver is designed to perform all processing processers of GPS except a RF (radio frequency)-front-end using a software module which operates in a general purpose processor. Ultimately, the software receiver design technology aims to include a software realization technology of RF-Front-End.

SUMMARY OF THE INVENTION

In a case of developing a hardware based receiver, the manufacturing cost is significant and the flexibility of the receiver that is once implemented is reduced. In other words, whenever various satellite navigation systems are newly developed, new hardware receiving platform should be developed.

Therefore, when the navigation receiver technology is implemented based on software, the cost is significantly reduced and the system can be developed so as to flexibly copy with various satellite navigation systems. Further, it is possible to easily develop various navigation algorithms using the receiver.

However, the software signal receiver has a problem in that it takes much more time than a known hardware receiver to process signals. The hardware receiver processes signals based on hardware so that it takes less time to process signals. Therefore, the hardware receiver may generate a navigation solution in real time.

It is required to efficiently design a correlator in which calculating loads are large in order to process a satellite navigation signal in real time in such a software receiver, similarly to the known hardware receiver.

An exemplary embodiment of the present invention provides a signal processing method of a satellite navigation signal, including: a frequency generating step generating a predetermined frequency component for removing a frequency component of sample data; a code generating step generating a predetermined code component for removing a code component of the sample data and increasing a sample count when the predetermined code component is generated; and a correlation value generating step, if the sample count is equal to a count per unit time, generating a correlation value between the generated predetermined frequency component and the generated predetermined code component by reading a sample data block.

Another exemplary embodiment of the present invention provides a correlator, including: a measurement value generating unit configured to generate a measurement value at every predetermined unit time; a frequency generating unit configured to generate a predetermined frequency component for removing a frequency component of sample data; a code generating unit configured to generate a predetermined code component for removing a code component of the sample data; and a code/frequency correlating unit configured to generate component data obtained by multiplying the generated predetermined frequency component and the generated predetermined frequency component for a predetermined code cycle to correlate with the sample data.

Yet another exemplary embodiment of the present invention provides a software signal receiver, including: a signal obtaining unit configured to receive IF data (intermediate frequency data) to obtain a signal; a signal tracing unit configured to read the sample data so as to correspond to a set predetermined code cycle using the signal obtained in the signal obtaining unit to trace the signal; and a navigation solution processing unit configured to generate a navigation solution using measurement data and navigation data generated in the signal tracing unit.

According to exemplary embodiments of the present invention, a function that removes and correlates a code and a frequency component from sample data of an IF (intermediate frequency) signal is performed by calling a correlation function for every predetermined unit rather than per every sample so that it is possible to reduce the number of calls of a function and minimize a calculating time. Further, when a correlation value of the code and the frequency is generated, an amount of sample data required for actual correlation is determined based on a regular unit interval so that it is possible to process per sample block unit.

The foregoing summary is illustrative only and is not intended to be in any way limiting. In addition to the illustrative aspects, embodiments, and features described above, further aspects, embodiments, and features will become apparent by reference to the drawings and the following detailed description.

Figures 1, 2:
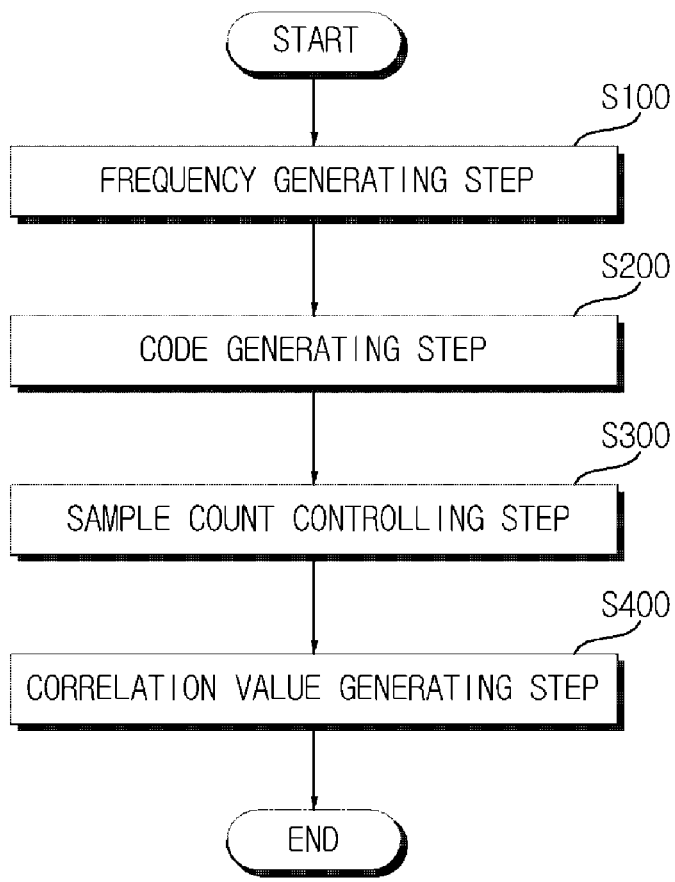
FIG. 1 is a flowchart of a signal processing method using a code cycle in processing a satellite navigation signal according to an exemplary embodiment of the present invention.
FIG. 2 is a diagram showing an example that converts to a position of a frequency to be generated using a value of highest three bits of a DCO component in a loop filter of a signal tracing channel according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

Specific terms are provided to help understandings of the present invention. The use of the specific terms may be changed into other forms without departing from the technical idea of the present invention.

Hereinafter, a signal processing method, a correlator, and a software signal receiver using a code cycle in processing a satellite navigation signal of an exemplary embodiment of the present invention will be described with reference to drawings and embodiments.

FIG. 1 shows a signal processing method using a code cycle in processing a satellite navigation signal according to an exemplary embodiment of the present invention.

In a signal processing method of a satellite navigation signal in a correlator, a frequency generating step S100 generates a predetermined frequency component for removing a frequency component. For example, in order to remove the frequency component, a frequency orthogonal to the frequency component of sample data is generated and mixed with sample data to remove the frequency component of the sample data.

The frequency generating step S100 allows a frequency generating unit 20 to update a frequency DCO (digital controlled oscillator) and generate a predetermined frequency component. In other words, a correction value of a signal tracing frequency error is reflected to set an increment of the frequency DCO.

For example, as the correction value of the signal tracing frequency error, a value determined in a loop filter of a signal tracing channel may be input. The signal tracing frequency error refers to a difference between an integrated value of a previous signal and an integrated value of a current signal when signals are integrated, but this embodiment is not limited thereto.

The frequency DCO is updated by adding the increment of the frequency DCO. The frequency DCO may be stored in a predetermined variable and the stored frequency DCO is read out and updated by adding the increment of the frequency DCO thereto.

a bit value of an updated frequency DCO is converted into a position of a frequency to be generated. For example, the highest three bits of the frequency DCO is converted into position of the frequency using four drawn values (±1, ±2). Referring to FIG. 2, the conversion to the position of the frequency, for example, is implemented by a method that stores a Sine value and a Cosine value of a position of a component using values of the highest three bits of the DCO. A predetermined frequency component is generated based on the converted position of the frequency and the frequency component is represented by an inphase correlation value (Inphase I) signal and a 90 degree phase modulated correlation value (Quadrature-phase Q) signal.

A code generating step S200 allows a code generating unit 30 to generate a predetermined code component for removing a code component of the sample data and increase a sample count when the predetermined code component is generated.

The code component refers to a satellite code of a GPS satellite that transmits a satellite navigation signal so as to be included in a transmission signal when a satellite navigation signal is transmitted to the ground as an RF (radio frequency) signal. For example, the satellite code includes an identification signal such as a PRN number. In this case, in the receiver, the identification code of the satellite needs to be removed from the received data.

In the code generating step, a correction value of a signal tracing code error is reflected to set the increment of the code DCO. The correction value of the signal tracing code error may be input as a value determined in the loop filter of the signal tracing channel. The code DCO is updated by adding the increment of the code DCO.

If the increased code DCO exceeds a set value of the code DCO for updating a code, the increased code DCO is stored to update the code DCO. In contrast, if the increased code DCO is below the set value of the code DCO for updating a code, a code DCO before the update is stored so that the code DCO is not updated. The code DCO is stored in a predetermined variable, and a predetermined code component is generated based on the code DCO.

A correlation value generating step S400 allows a code/frequency correlating unit 40 to generate a correlation value between the predetermined frequency component generated in the frequency generating step and the predetermined code component generated in the code generating step by reading a sample data block when the sample count is equal to a count per unit time.

The correlation value may be generated by multiplying the frequency component and the code component by the sample data and used to trace a signal. When there is a linear relationship or a directional property/dependence between general two variables, the correlation value indicates that there is correlation relationship/correlationship between the two variables. The correlation value may be a value obtained by removing the frequency component and the code component of the sample data.

The unit time refers to a cycle of reading the sample data, which is arbitrarily set. For example, when the unit time is set to 1 ms, the sample data is read out at a cycle of 1 ms. The count per unit time is set to 5714 per 1 ms when a sampling rate per unit time is 5.714 Mbps. The count per unit time may be calculated based on the sampling rate, but the invention is not limited thereto.

A sample data block may be implemented by a group of sample data configured by reading sample data as many as the sample counts. When the sample data block is configured by reading sample data as many as the sample counts and the number of sample data of the sample data block corresponds to the count per unit time, the code position and the code DCO are updated.

For example, if the sampling rate is 5.714 Mbps, the count per unit time is 5,714. Further, if the sample count is 5.714, the code position and the code DCO are updated. Therefore, 5714 sample data are read out at one time to configure the sample data block. Since the count per unit time and the sample count are equal to each other, the code position is increased to a predetermined unit and the code DCO is updated. The increase unit of the code position is 1, but this invention is not limited thereto.

That is, in the hardware receiver and the software receiver, a block that requires the most time is a correlator. Other functional blocks than the correlator operate at a unit of 1 ms, 20 ms, or 100 ms. Therefore, calculation load and required time is not so much. In contrast, the correlator operates in a unit of an input sample, which requires a large amount of calculation and time. Therefore, the correlation processing using a sample data block according to an exemplary embodiment of the invention calls in a unit of a sample data block rather than an input sample unit, which results in reducing a calculation load and a required time.

A correlation value for tracing a signal is generated by multiplying the configured sample data block by the predetermined frequency component generated in the frequency generating step and the predetermined code component generated in the code generating step. That is, the correlation value is generated not by reading out data from every individual sample to read the frequency component and the code component, but by reading out the sample data block at one time to determine and compensate the frequency of the signal tracing channel and an error component of the code for the sample data configuring the block.

After all, the error correlation value is reflected again to the DCO increment of the correlator and the sample data is processed in a block unit so that the number of function calls is reduced and the computing time is minimized.

In the related art, when the sample data is read out in a block unit, since there is no information on how many data is actually read, it is difficult to process the sample data in a block unit. In contrast, in this embodiment, when the code/frequency correlation value is generated, an amount of sample data that is required for actual correlation is determined based on a predetermined code cycle, which enables processing in a block unit.

Figure 3:
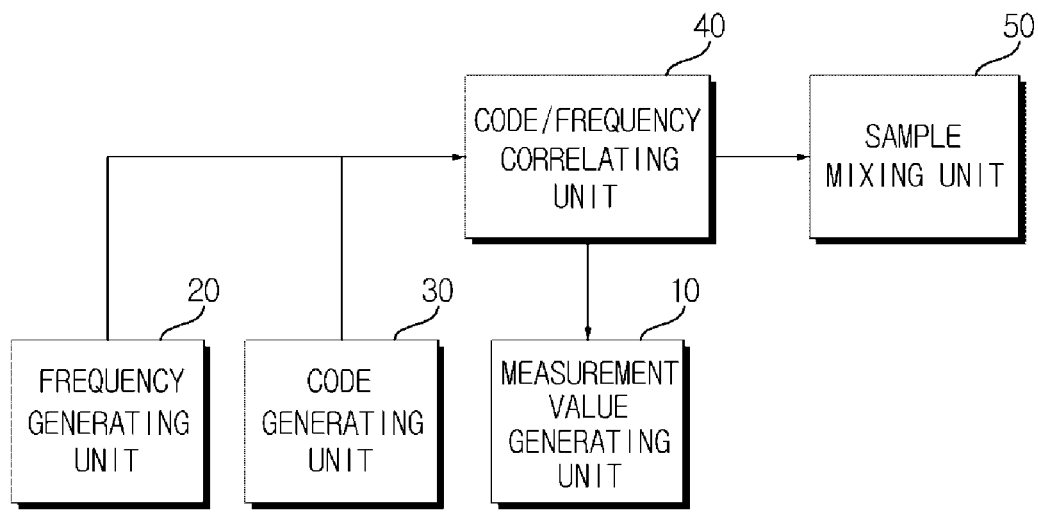
FIG. 3 is a block diagram of a correlator using a code cycle in processing a satellite navigation signal according to another exemplary embodiment of the present invention.

FIG. 3 shows a correlator using a code cycle in processing a satellite navigation signal according to an exemplary embodiment of the present invention.

The correlator includes a measurement value generating unit 10, a frequency generating unit 20, a code generating unit 30, a code/frequency correlating unit 40, and a sample mixing unit 50.

The measurement value generating unit 10 generates a measurement value at every predetermined unit time. The measurement value generating unit 10 generates a measurement value based on a sample value accumulated by removing a code component and a frequency component from the sample data.

The frequency generating unit 20 generates a predetermined frequency component for removing a frequency component of the sample data. The generated predetermined frequency component and the frequency component of the sample data are multiplied together to remove a frequency component. For example, a frequency having the same wave form as the frequency component of the sample data but having different phase is mixed with the frequency of the sample data to remove the frequency component of the sample data. The frequency generating unit may include an integrator in order to remove the frequency component of the sample data.

The frequency generating unit 20 may generate a predetermined frequency component until a predetermined code cycle is completed. The predetermined code cycle refers to a cycle that is set to calculate a correlation value in a block unit of the sample data, not the input sample. For example, when the predetermined code cycle is set to one code cycle, the predetermined frequency component is generated for one code cycle.

The code generating unit 30 generates a predetermined code component for removing a code component of the sample data. For example, the code component and the code component of the sample data are multiplied together to remove the code component. If the code component of the sample data is 101, 010 is mixed thereto to remove the code component.

The code generating unit 30 may generate a predetermined code component until a predetermined code cycle is completed. For example, if the predetermined code cycle is set to one code cycle, the predetermined code component is generated for one code cycle.

The code/frequency correlating unit 40 generates component data obtained by multiplying the predetermined frequency component generated in the frequency generating unit and the predetermined code component generated in the code generating unit together to correlate with the sample data for a predetermined code cycle. For example, the predetermined code cycle may be set to one code cycle, and the component data is generated for the predetermined code cycle to be stored.

That is, differently from the related art, the frequency generating unit 20 and the code generating unit 30 generate the predetermined frequency component and the predetermined code component to correlate with the sample data for a predetermined time without being mixed with the sample data based on the input IF (intermediate frequency) in a sample unit.

For example, in the related art, the code and frequency components generated per every input sample are generated to be mixed to generate the correlation value. But, in this case, a function for correlation is called per every sample, which takes a lot of time. In contrast, in this embodiment, the code and frequency components are generated for the predetermined unit cycle, with only one call, the predetermined code component and the predetermined frequency component required for correlation with the actual sample are generated.

The sample mixing unit 50 reads component data generated in the code/frequency correlating unit 40 per every code cycle and the sample data corresponding thereto to generate the correlation value. The sample data corresponding to the component data includes a sample data block configured by the number of sample data calculated for the predetermined unit of cycle. The predetermined code cycle may be set to one code cycle. The correlation value may be a value excepting the frequency component and the code component of the sample data.

Figure 4:
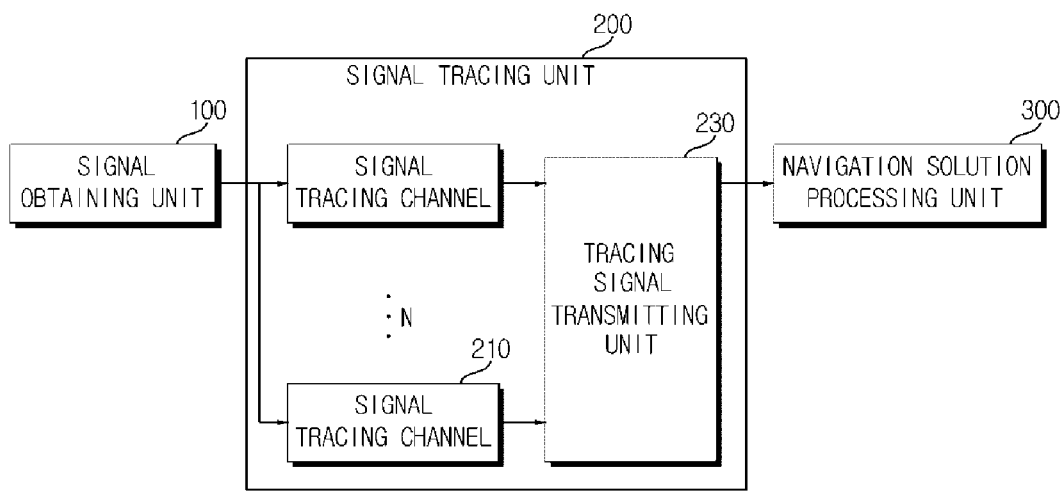
FIG. 4 is a block diagram of a software signal receiver using a code cycle in processing a satellite navigation signal according to another exemplary embodiment of the present invention.
Figure 5:
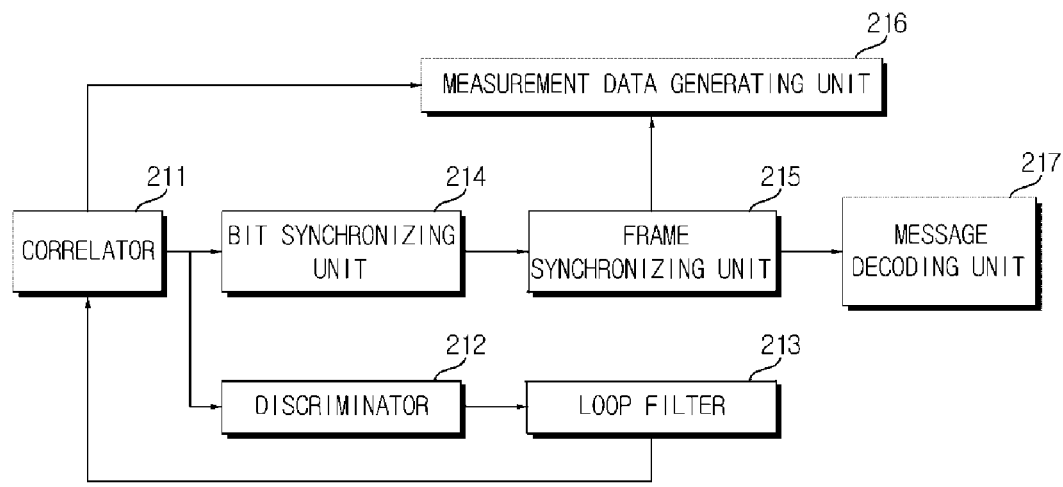
FIG. 5 is a block diagram of a signal tracing channel of a software signal receiver according to another exemplary embodiment of the present invention.

FIG. 4 shows a software signal receiver using a code cycle in processing a satellite navigation signal according to an exemplary embodiment of the present invention.

The software signal receiver includes a signal obtaining unit 100, a signal tracing unit 200, and a navigation solution processing unit 300.

The signal obtaining unit 100 receives IF (intermediate frequency) data to obtain a signal. A RF (radio frequency) navigation signal that is transmitted from the GPS navigation satellite to the ground is converted into an IF data at the RF front end so as to be processed by the software signal processing unit. When the signal is successfully obtained, the signal is transmitted to the signal tracing unit 200.

For example, the signal obtaining unit 100 obtains a code position and Doppler of the satellite signal using input IF data. The signal obtaining unit 100, for example, is implemented so as to generate signal obtaining information using a MFFFT (matched filter-fast Fourier transform) method. By obtaining the signal, a signal of a visible satellite is detected through the code delay and the search of Doppler frequency level. Search sections are set at a regular interval. Correlation for the corresponding Doppler frequency and a code is sequentially inspected per search section to determine the acquisition of the signal.

A search range of the Doppler frequency is determined based on a dynamic condition of an aviation body. A local signal is generated from the frequency generating unit 20 and the code generating unit 30 using the Doppler frequency and the code delay in a formed search space and mixed with an intermediate frequency to output the inphase I signal and the quadrature-phase Q signal. A signal power of integrated I signal and Q signal is compared with a threshold to determine the acquisition of the signal.

The signal tracing unit 200 reads sample data so as to correspond the predetermined code cycle set using the obtained signal in the signal obtaining unit 100 to trace the signal. The signal tracing unit 200 includes N (N is a natural number) signal tracing channels 210 and a traced signal transmitting unit 230.

Signal obtained satellite PRN (pseudo random noise) numbers are independently allocated to the signal tracing channels 210 and the signal tracing channels 210 independently trace satellite PRN signals. The PRN signals have a unique number for every satellite and the receiver generates and correlates codes of the satellite.

Each of the signal tracing channels 210 includes a correlator 211, a discriminating unit 212, a loop filter 213, a bit synchronizing unit 214, a frame synchronizing unit 215, a measurement data generating unit 216, and a message decoding unit 217.

The correlator 211 reads sample data corresponding to the predetermined code cycle to correlate the sample data with a code and a frequency. For example, the predetermined code cycle is set to 1 ms, and the sample data corresponding to the predetermined code cycle refers to sample data corresponding to the number of samples of a cycle of 1 ms. That is, the correlator 211 may generate I and Q signals by multiplying or integrating the input sample data and the code and the frequency together.

The discriminating unit 212 and the loop filter 213 estimate and control the frequency error using the input signal. The discriminating unit 212 uses a correlation value of the correlator 211 to determinate a signal tracing error. The loop filter 213 compensates the signal tracing error determined in the discriminating unit 212. According to the exemplary embodiment of the present invention, the signal tracing error is defined as functions of a line integral time, a noise bandwidth, and a carrier wave SNR (signal-to-noise ratio) and the loop filter is designed considering the signal tracing error. However, the invention is not limited to the above embodiment.

The bit synchronizing unit 214 uses the correlation value generated in the correlator 211 to synchronize the bit. Bit synchronization refers to synchronization of bit data with a satellite signal. The bit synchronizing unit 214, for example, is implemented to determine the synchronization using a CLI (carrier lock indicator) and a 1 ms counter, but the invention is not limited to the above-implemented example.

The frame synchronizing unit 215 uses the result of bit synchronization in the bit synchronizing unit 214 to synchronize the frame. The frame synchronization refers to the synchronization of sub frame data with the satellite signal. According to an implemented example, a GPS satellite time may be defined through the frame synchronization.

The measurement data generating unit 216 uses the value measured by the correlator 211 to generate navigation data and the message decoding unit 217 uses the frame synchronization to generate orbit data.

The tracing signal transmitting unit 230 transmits data generated from the N signal tracing channels 210 to the navigation solution processing unit 300.

The navigation solution processing unit 300 uses data generated in the signal tracing unit 200 to generate a navigation solution. The navigation solution processing unit 300 uses the measurement data and the navigation data transmitted from the signal tracing channels to obtain a position of the receiver. The navigation solution processing unit 300 may be implemented by at least four signal tracing channels.

The exemplary embodiments of the present invention may be implemented by a computer program. Codes and code segments that configure the computer program may be easily deducted by computer programmers in the art. Further, the computer program may be stored in a computer readable information storage media and read and executed by the computers to implement the embodiments. The information storage media may include magnetic recording media, optical recording media, and carrier wave media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A signal processing method of a satellite navigation signal, comprising:
    a frequency generating step generating a predetermined frequency component for removing a frequency component of sample data;
    a code generating step generating a predetermined code component for removing a code component of the sample data and increasing a sample count when the predetermined code component is generated; and
    a correlation value generating step, if the sample count is equal to a count per unit time, generating a correlation value between the generated predetermined frequency component and the generated predetermined code component by reading a sample data block in a correlation value generating step, wherein the correlation value generating step includes:
    a sample data block configuring step configuring a sample data block by reading the sample data as many times as the number of sample counts; and
    a step of generating a correlation value by multiplying the configured sample data block and the generated predetermined frequency component and the generated predetermined code component together.

2. The method of claim 1, wherein the sample data block configuring step includes:
    if the number of sample data of the sample data block equal to the count per unit time, updating a code DCO (digital controlled oscillator) for generating a code position and a code component.

3. The method of claim 2, further comprising:
    if the code position and the code DCO are updated, initializing the sample count.

4. The method of claim 1, further comprising:
    if a code position completes one code cycle, updating a measurement value used to measure a pseudo distance.

5. The method of claim 1, wherein the frequency generating step includes:
    setting an increment of a frequency DCO for generating a frequency by reflecting a correction value of a signal tracing frequency error;
    updating the frequency DCO by adding the increment of the frequency DCO to the frequency DCO; and
    converting a bit value of the updated frequency DCO to a position of a frequency to be generated using a bit value of the updated frequency DCO and generating the predetermined frequency component based on the generated frequency position.

6. The method of claim 1, wherein the code generating step includes:
    setting an increment of a code DCO for generating the code component by reflecting the signal tracing code error;
    adding the increment of the code DCO to the code DCO and storing an increased code DCO if the increased code DCO exceeds a code DCO setting value for updating the code; and
    generating the predetermined code using the stored code DCO.

7. A correlator, comprising:
    a measurement value generating unit configured to generate a measurement value at every predetermined unit time;
    a frequency generating unit configured to generate a predetermined frequency component for removing a frequency component of sample data;
    a sample mixing unit configured to read the component data generated in the code/frequency correlating unit at every predetermined code cycle and the sample data corresponding to the data to generate a correlation value;
    a code generating unit configured to generate a predetermined code component for removing a code component of the sample data; and
    a code/frequency correlating unit configured to generate component data obtained by multiplying the generated predetermined frequency component and the generated predetermined frequency component for a predetermined code cycle to correlate with the sample data.

8. The correlator of claim 7, wherein the frequency generating unit generates the predetermined frequency component until the predetermined code cycle is completed, and
    the code generating unit generates the predetermined code component until the predetermined code cycle is completed.

* * * * *